(12) United States Patent
Toumani et al.

(10) Patent No.: US 7,443,918 B1
(45) Date of Patent: Oct. 28, 2008

(54) METHOD AND APPARATUS FOR EXTENDING THE FREQUENCY RANGE OF MULTI-TONE MODEMS

(75) Inventors: Rouben Toumani, San Jose, CA (US); Sam Heidari, Menlo Park, CA (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 11/980,832

(22) Filed: Oct. 30, 2007

Related U.S. Application Data

(63) Continuation of application No. 11/081,419, filed on Mar. 15, 2005, now Pat. No. 7,359,444.

(60) Provisional application No. 60/553,655, filed on Mar. 15, 2004.

(51) Int. Cl.
 *H04K 1/10* (2006.01)
(52) U.S. Cl. ..................................... 375/260
(58) Field of Classification Search ............... 375/260, 375/295, 270, 275, 277, 284, 285, 346; 370/485, 370/487, 210, 206, 437, 465, 468, 526
See application file for complete search history.

(56) References Cited

U.S. PATENT DOCUMENTS

5,781,728 A 7/1998 Rybicki et al.

*Primary Examiner*—Sam K Ahn
(74) *Attorney, Agent, or Firm*—IP Creators; Charles C Cary

(57) ABSTRACT

An inverse discrete Fourier transform (IDFT) processor processing a lower frequency image of a selected transmit band along with base images of remaining transmit bands called for in a corresponding X-DSL standard. A hybrid upconverter processing the IDFT output by generating a higher frequency replication of the imaged transmit band falling in the standards based frequency range along with the base band images of remaining transmit bands and selectively passing onto the communication medium only images or replications called for by the standards. A hybrid downconverter processing at least one of the received bands at sampling rates below Nyquist thereby creating a lower frequency image within the range of a discrete Fourier transform (DFT) processor. The hybrid downconverter clears the frequency band in which the image processed at sub-Nyquist rates will fold. The DFT then transforms only the images or replications falling within its frequency range.

13 Claims, 10 Drawing Sheets

FIG. 12A                        Transmitter

FIG. 12B                        Transmitter

FIG. 13A                        Receiver

FIG. 13B                        Receiver

METHOD AND APPARATUS FOR EXTENDING THE FREQUENCY RANGE OF MULTI-TONE MODEMS

CROSS REFERENCE TO RELATED APPLICATION

This application is a continuation of prior filed U.S. Utility patent application Ser. No. 11/081,419 filed Mar. 15, 2005 entitled "Method and Apparatus for Extending the Frequency range of Multi-Tone Modems" now U.S. Pat. No. 7,359,444, which claims the benefit of prior filed Provisional Application No. 60/553,655 filed on Mar. 15, 2004 entitled "Extending the effective frequency range of FFT and IFFT in DMT modems through the use of folded images" both of which are incorporated herein by reference in their entirety as if fully set forth herein.

BACKGROUND OF THE INVENTION

1. Field of Invention

The present invention is generally related to modems, and more particularly to modems supporting multi-tone multi-band modulation protocols.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voiceband frequencies, thus an X-DSL modem may operate simultaneously with a voiceband modem or a telephone conversation.

Currently there are over ten discrete X-DSL standards, including: G.Lite, ADSL, VDSL, SDSL, MDSL, RADSL, HDSL, etc. XDSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop.

What is needed is scalable modem architecture that allows a more flexible hardware response to the evolving X-DSL standards and the problems associated with providing hardware to handle each new standard.

SUMMARY OF THE INVENTION

A method and apparatus is disclosed for extending the frequency range of multi-tone modems without the requirement of an increase in the size, frequency range or complexity of the associated Fourier transform circuit or processes. The approach is of particular advantage with respect to X-DSL protocols calling for multiple frequency division multiplexed upstream and downstream bands.

Signal generation is accomplished by allowing a Inverse Discrete Fourier Transform (IDFT) processor to process a lower frequency image of at least one selected transmit band along with such other base images of any remaining lower frequency transmit bands as may be called for in a corresponding X-DSL standard. A hybrid upconverter then processes the time domain output of the DFT by generating a higher frequency replication of the imaged transmit band which falls in the required standard based frequency range along with the baseband images of all remaining transmit bands and replications thereof. The hybrid upconverter selectively passes onto the communication medium, e.g. subscriber line, only the mix of images and/or replications thereof as called for the corresponding X-DSL standard. In a typical multi-band standard with multiple discrete transmit bands, this results in processing of some of the transmit bands at sampling rates below the Nyquist rate and others at sampling rates at or above the Nyquist rate.

Signal detection also supports processing a mix of receive bands at sampling rates above and below the Nyquist rate. A hybrid downconverter processes at least one of the received bands at sampling rates below Nyquist thereby creating a corresponding lower frequency image that preserves all information content albeit at a lower frequency band within the range of the discrete Fourier transform (DFT) processor. The hybrid downconverter first clears the frequency band in which the image of the receive band(s) processes at sub-Nyquist rates is going to fold. The DFT then effects time-to-frequency domain transformations only on the mix of images and/or lower frequency replications thereof as fall within its frequency range. Due to the operation of the hybrid downconverter this mix includes all the information on the received communication channel.

BRIEF DESCRIPTION OF THE DRAWINGS

These and other features and advantages of the present invention will become more apparent to those skilled in the art from the following detailed description in conjunction with the appended drawings in which:

FIGS. 7A-7E are graphs showing spectral baseband images and replications thereof at various points in the transmit and receive pathways shown in FIGS. 6 and 8.

FIGS. 10A-10E are graphs showing spectral baseband images and replications thereof at various points in the transmit and receive pathways shown in FIGS. 9 and 11.

DETAILED DESCRIPTION OF THE EMBODIMENTS

A method and apparatus is disclosed for extending the frequency range of multi-tone modems without the requirement of an increase in the size, frequency range or complexity of the associated Fourier transform circuit or processes. The approach is of particular advantage with respect to X-DSL protocols calling for multiple frequency division multiplexed upsteam and downstream bands.

The maximum frequency range specified for a particular X-DSL band plan, and the tone spacing, dictate the size of discrete Fourier transform (DFT) and inverse discrete Fourier transform (IDFT) design in discrete multi-tone (DMT) modems. Also, in practical implementations the DFT and IDFT size, and hence complexity, grow in multiples of 2. For example one can have 1024, 2048, or 4096 tone DFT/IDFT. As an example, for the International Telecommunications Union, ITU-T G.993.1 Bandplan-1 (same as American National Standards Institute Plan 998, ETSI bandplan), a.k.a. plan 998, with 4.3125 kHz tone spacing, specified in the standards, the maximum frequency range in the upstream direction is 12 MHz. This translates into a requirement of a 4096 tone FFT. However, it is worth noting that only a small fraction of these tones are actually used for transmission of data, and a lot of spare capacity is wasted. For this particular bandplan less than one third of the available spectrum is actually used. The DFT must have the capability to process signals up to 17.6 MHz even though only less than 5 MHz of that capacity is used.

In an embodiment of the current invention a novel combination of reduced complexity Fourier transform engines coupled to corresponding hybrid up/downconverters allows folded and non-folded images to be used in transmitting and receiving a multi-band communication channel. By judicious choice of the sampling frequency, and by appropriate filtering of the original signal or the folded images, signal generation and detection is effected by DFT/IDFT engines, for signals that on the communication medium, extend beyond the frequency range of the DFT and/or DFT engines. This results in a more efficient utilization of the IDFT/DFT capacity.

There are two parts to this invention. One is the generation of the signal at the transmit end by the IDFT, and the other is the detection of the signal at the receive end by the DFT.

Signal Generation

In the generation of the signal, the output of the IDFT already consists of the original signal and the higher frequency folded images, which are symmetrically placed around Fs/2, where Fs is the sampling frequency. Usually the sampling frequency would also correspond to the Nyquist frequency appropriate for the particular size of the IDFT. If the desired transmit frequency band at the output is beyond the IDFT frequency range (Fs/2), one can create and process a lower frequency image within the frequency range of the IDFT, such that after folding the replicated image falls in the frequency band of interest. Subsequently the original lower frequency image that is no longer needed will be filtered out, leaving only the frequency band of interest on the communication medium along with such other baseband images as are called for by the relevant X-DSL standard.

Signal Detection

For detecting signals that are beyond the DFT frequency range, the received signal is sampled first at a sub-Nyquist rate, thereby creating images that preserves all of the information content, but in a lower band within the range of the DFT, and then filter out the undesired frequencies. Before this sub-Nyquist sampling takes place the frequency band on which the image is going to fold onto has to be cleared of all unwanted signals through filtering. Generally in signals processing, one makes sure that the sampling frequency is equal or higher than the Nyquist rate to avoid aliasing. However, in this particular invention, aliasing is used to advantage to translate the received frequency bands to a lower range, where they can be processed.

Figures 1A, 1B:
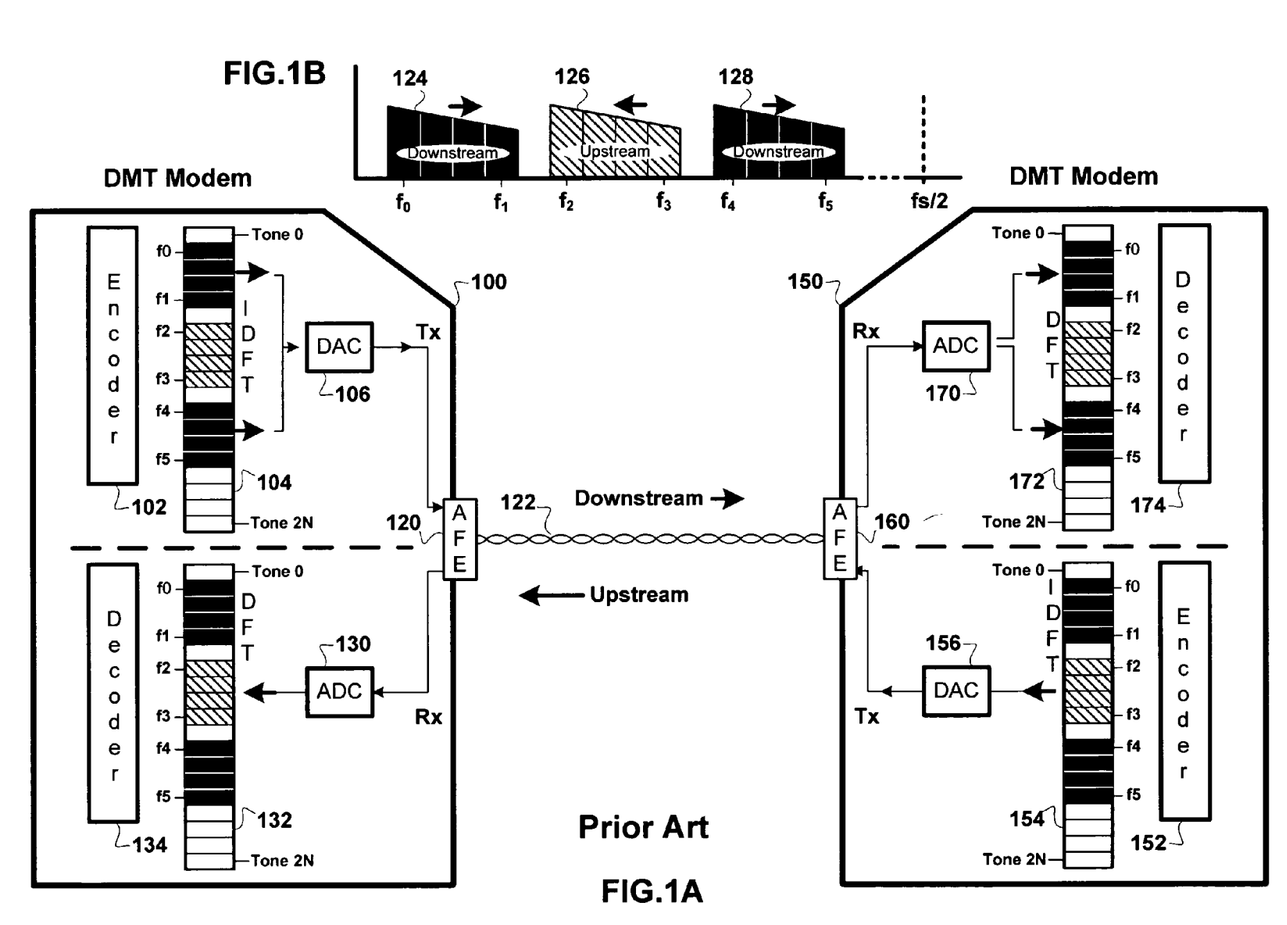
FIG. 1A is a hardware block diagram of a pair of prior art modems coupled to one another across a communication medium.
FIG. 1B is a graph of a band plan of upstream and downstream bands over which multi-tone modulated communications between the modems is effected.

FIG. 1A is a hardware block diagram of a pair of prior art modems 100 and 150 coupled to one another across a communication medium 122. DMT modem 100 includes on the transmit path: an encoder 102, an IDFT 104 with 2N tones and a digital-to-analog converter (DAC) coupled through analog front end (AFE) 120 to the communication medium 122. DMT modem includes on the receive path an analog-to-digital converter (ADC) 130, which couples the AFE 120 to the DFT 132 which also has a size 2N indicating the number of tones. The decoder 134 couples to the DFT 132 to process the frequency domain output thereof.

The opposing modem 150 is identically configured as follows. The transmit path includes: an encoder 152 coupled to an IDFT 154, and a DAC 156 coupled through AFE 160 to the communication medium 122. The receive path includes: an ADC 170 which couples the AFE 160 to the DFT 172 which also has 2N tones. The decoder 174 couples to the DFT 172 to process the frequency domain output thereof.

FIG. 1B is a graph of a band plan of upstream band 126 and downstream bands 124, 128 over which multi-tone modulated communications between the modems 100 and 150 is effected.

Figures 2A, 2B:
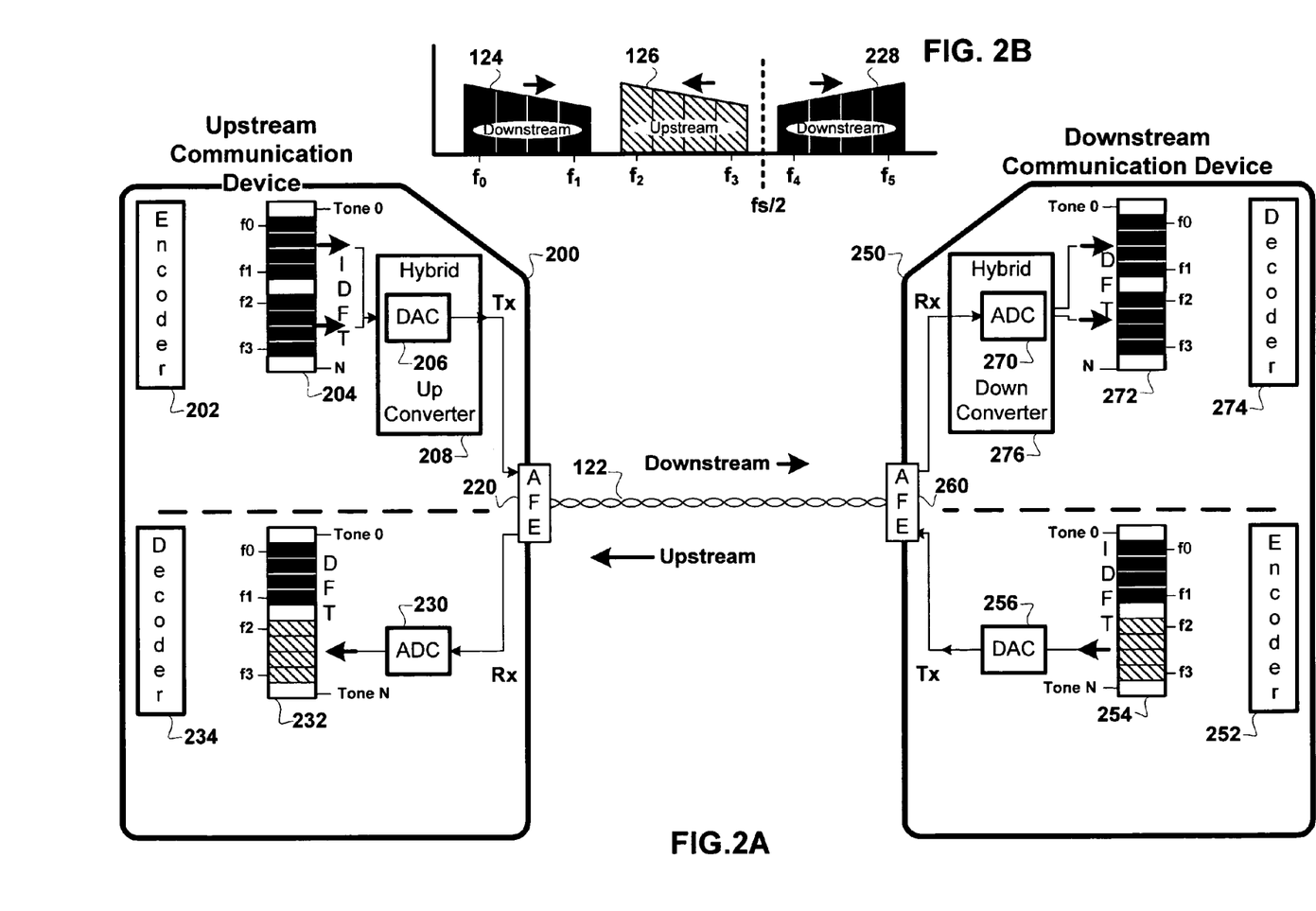
FIG. 2A is a hardware block diagram of a pair of communication devices according to an embodiment of the invention.
FIG. 2B is a graph of the band plan shown in FIG. 1B in which a higher frequency one of the downstream bands exhibits a spectral inversion.

FIG. 2A is a hardware block diagram of a pair of communication devices 200 and 250 according to an embodiment of the invention. The communication devices support the same band plan as that shown in FIG. 1B yet require only half the size in their DFT and IDFT processors, e.g. N tones.

Communication device 200 includes on the transmit path: an encoder 202, an IDFT 204 with N tones and a DAC 206 which is part of the hybrid upconverter 208. This in turn is coupled through AFE 220 to the communication medium 122. The communication device 200 includes on the receive path: an ADC 230, which couples the AFE 220 to the DFT 232 which also has a size N tones. The decoder 234 couples to the DFT 232 to process the frequency domain output thereof.

The opposing modem 250 is configured as follows. The transmit path includes: an encoder 252 coupled to an IDFT 254, and a DAC 256 coupled through AFE 260 to the communication medium 122. The receive path includes: an ADC 270 which is part of a hybrid downconverter 276. This downconverter couples the AFE 260 to the DFT 272 which also has N tones. The decoder 274 couples to the DFT 272 to process the frequency domain output thereof.

The reduction in DFT/IDFT size is the result of the mapping of the higher frequency one of the downstream bands 228 shown in FIG. 2B into the gap afforded by the upstream band 126. The other downstream band 124 is not remapped since the IDFT spans the relevant frequency range. The upconverter 208 handles the replication of the baseband images and the filtering of the mix of baseband and replicated images required to support the band plan shown on the graph in FIG. 2B.

FIG. 2B is a graph of the band plan shown in FIG. 1B in which a higher frequency one of the downstream bands exhibits a spectral inversion. The spectral inversion is the result of the replication process and in this embodiment of the invention is processed by a complementary configuration on the receive path for the downstream channel on communication device 250.

Figures 3A, 3B:
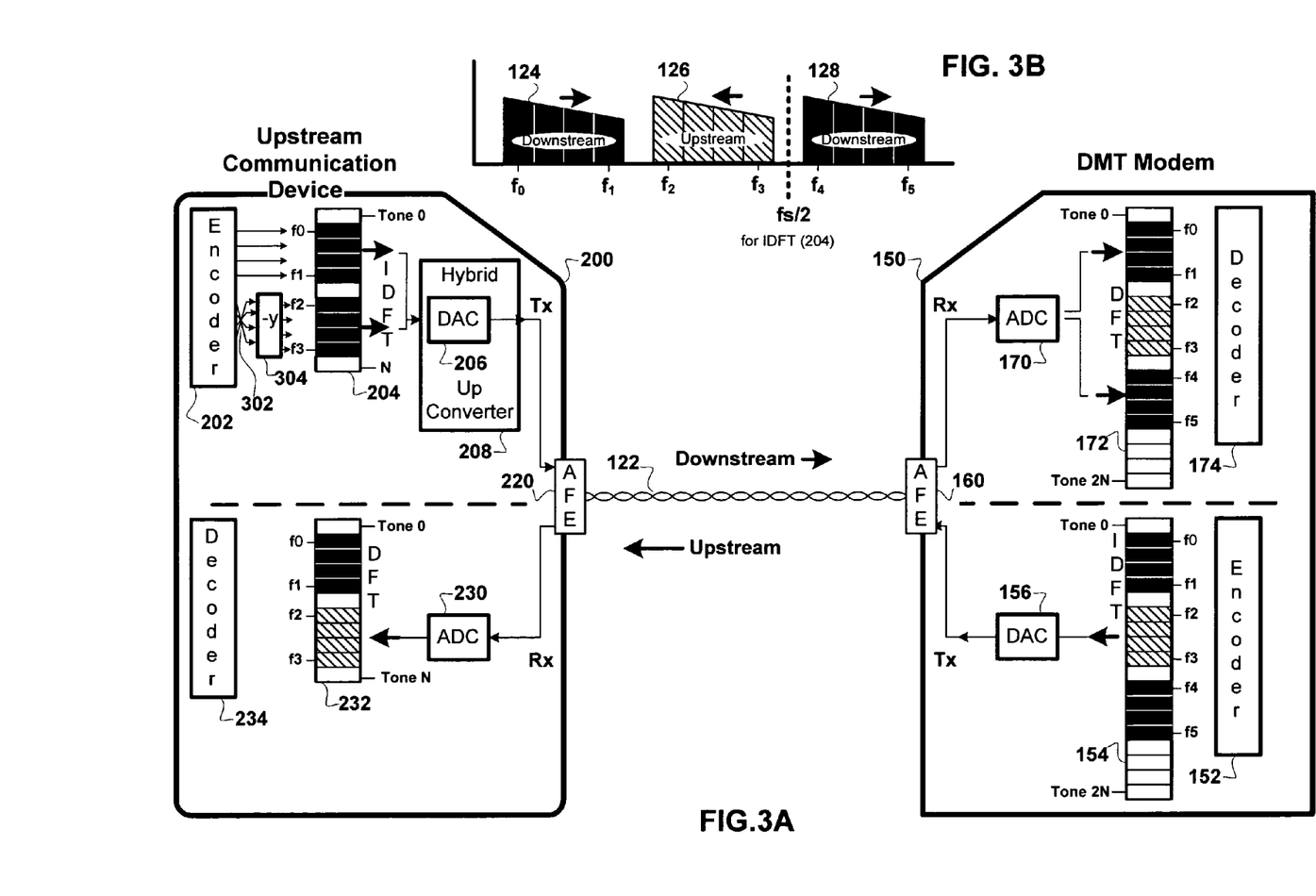
FIG. 3A is a hardware block diagram of a communication device according to an embodiment of the invention which includes a hybrid encoder and which couples across a communication medium with a DMT modem.
FIG. 3B is a graph of the band plan shown in FIG. 1B.

FIG. 3A is a hardware block diagram of the communication device 200 shown in FIG. 2A according to an embodiment of the invention which includes a hybrid encoder formed by: encoder 202 with a lower frequency portion of its outputs direct coupled to the IDFT 204 and a higher frequency portion of its outputs coupled in reverse order 302 to spectral normalizer 304. The communication device couples across the communication medium 122 with the DMT modem 150 shown in FIG. 1A.

The processing of the lower frequency band 124 (See FIG. 3B) in the IDFT tones has a direct relation to the frequency spectrum utilized. The transmission of the higher frequency band 128 (See FIG. 3B) results from upconversion in frequency. For this band, the image of the signal exhibits Hermitian symmetry with respect to the original signal, i.e. is reversed in frequency and complex conjugated with respect to the original signal. Two processes are required for spectral normalization. First, the tones must be loaded in reverse order. Second, the imaginary portion of each IDFT tone associated with this higher frequency band is negated (i.e. the sign is changed) prior to loading into the corresponding IDFT tone bins.

The hybrid encoder thus serves to normalize the higher frequency one of the downstream bands 128 by remove spectral inversion while at the same time avoiding anything other than the standard encoding for the lower frequency one of the downstream bands 124. The normalization is evidenced graphically by the slope of the downstream band 128. As a result of the hybrid encoding, the communication device with an IDFT 204 of size N tones can be coupled transparently to a DMT modem with a DFT 172 of size 2N tones.

FIG. 3B is a graph of the band plan shown in FIG. 1B.

Figures 4A, 4B:
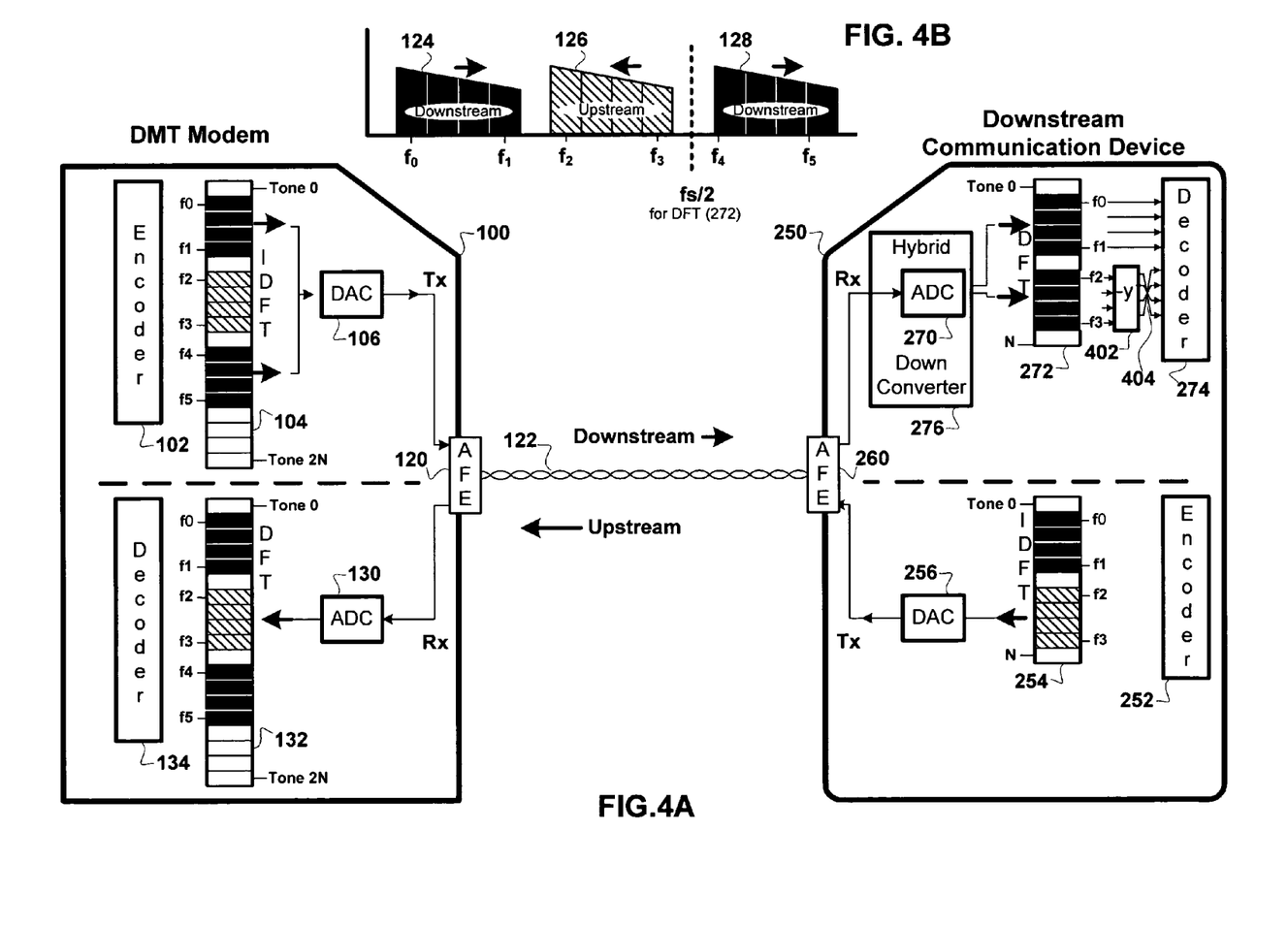
FIG. 4A is a hardware block diagram of a DMT modem which couples across a communication medium with a communication device according to an embodiment of the invention which includes a hybrid decoder.
FIG. 4B is a graph of the band plan shown in FIG. 1B.

FIG. 4A is a hardware block diagram of a DMT modem 100 as shown in FIG. 1A which couples across a communication medium with a communication device 250 shown in FIG. 2B and as further including in this embodiment of the invention a hybrid decoder. The hybrid decoder is formed by: decoder 274 with a lower frequency portion of its inputs direct coupled to the DFT 272 and a higher frequency portion of its inputs coupled in reverse order 404 to spectral normalizer 402. The communication device 250 couples across the communication medium 122 with the DMT modem 100.

The processing of the lower frequency band 124 (See FIG. 4B) in the DFT tones has a direct relation to the frequency spectrum utilized. In this embodiment both downstream bands are transmitted with no folding, imaging, replication and the IFFT tones all have direct relations to the frequency spectrum utilized. As defined in the corresponding X-DSL standard the encoder 102 on the transmit path of modem 100 will convert digital bits to X and Y values corresponding to real and imaginary inputs of the IFFT block respectively. For the lower frequency downstream band 124 the hybrid down converter 276 performs exactly as defined in the corresponding X-DSL standard. For the higher frequency band 128, the image of the signal created by the hybrid downconverter exhibits Hermitian symmetry with respect to the line signal, i.e. is reversed in frequency and complex conjugated with respect thereto. Thus decoding requires that the tones associated with this higher frequency band be read in reverse order 404 and that the imaginary portion thereof be negated, i.e. the sign changed.

The hybrid decoder 402, 404 274 thus serves to normalize the higher frequency one of the downstream bands 128 by remove spectral inversion while at the same time avoiding anything other than the standard encoding for the lower frequency one of the downstream bands 124. The normalization is evidenced graphically by the slope of the downstream band 128 shown in FIG. 4B. As a result of the hybrid encoding, the communication device with an DFT 272 of size N tones can be coupled transparently to a DMT modem 100 with a IDFT 104 of twice the size, i.e. 2N tones.

FIG. 4 is a graph of the band plan shown in FIG. 1B.

Figures 5A, 5B:
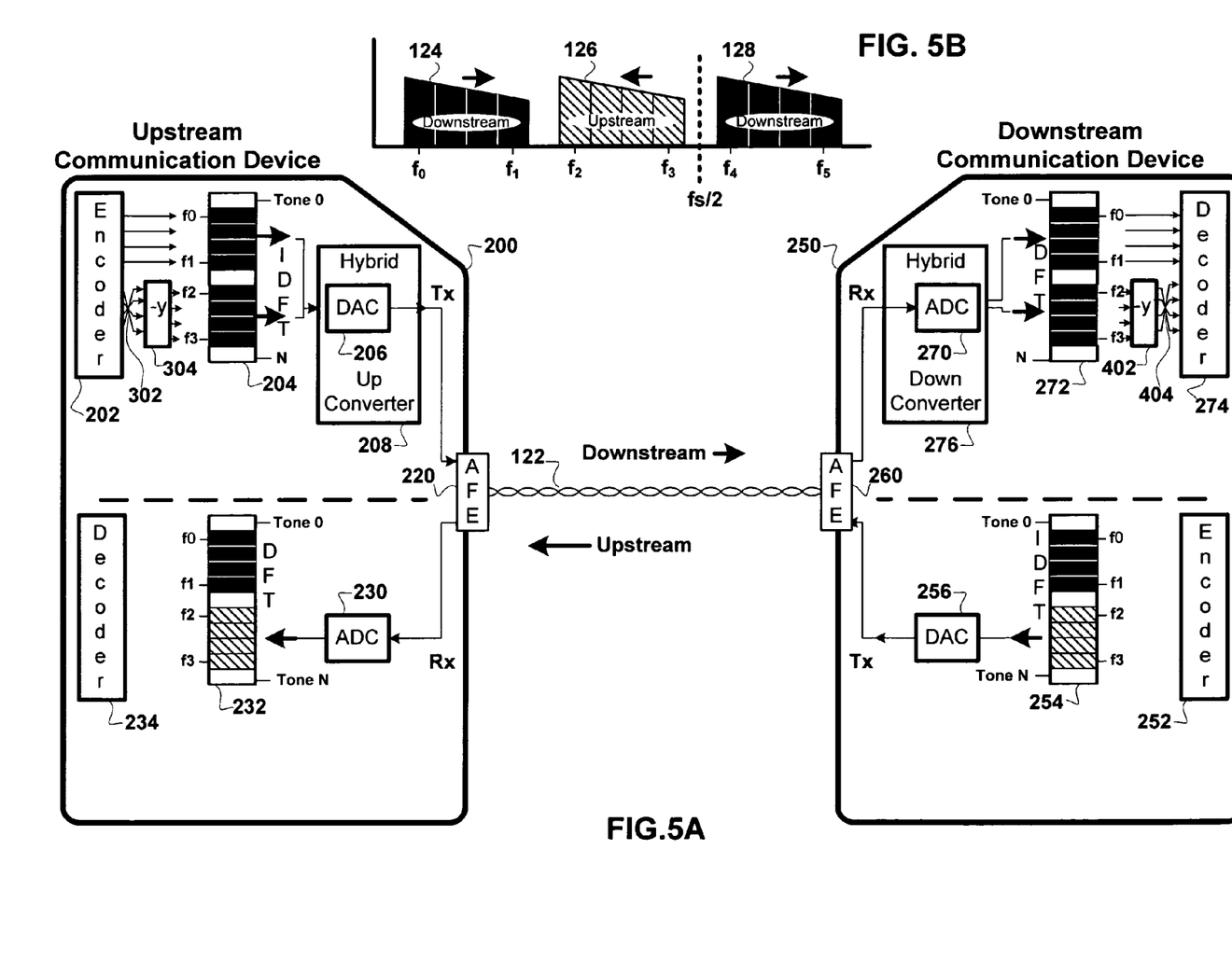
FIG. 5A is a hardware block diagram of a pair of communication devices according to an alternate embodiment of the invention to that shown in FIG. 2A.
FIG. 5B is a graph of the band plan shown in FIG. 1B.

FIG. 5A is a hardware block diagram of a pair of communication devices according to an alternate embodiment of the invention to that shown in FIG. 2A. In this embodiment of the invention both communication devices 200 and 250 contain the hybrid encoders and decoders discussed above with respect to FIGS. 3A and 4A respectively.

FIG. 5B is a graph of the band plan shown in FIG. 1B.

Figure 6:
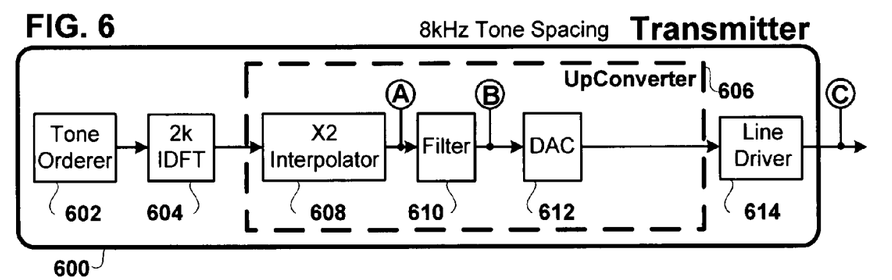
FIGS. 6 and 8 are hardware block diagrams of relevant portions of a transmitter and receiver respectively of a pair of communication devices according to an embodiment of the invention.
Figure 8:
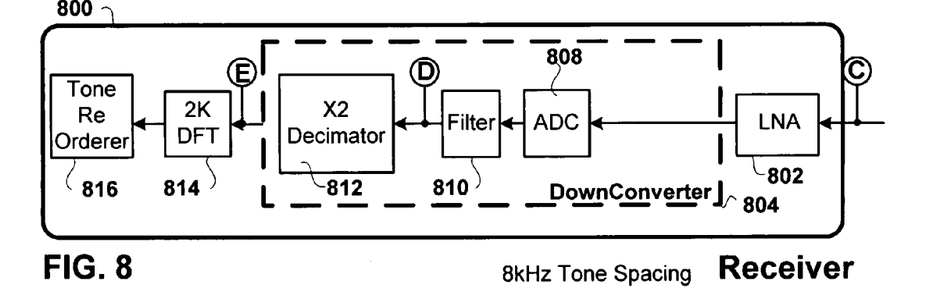

FIGS. 6 and 8 are hardware block diagrams of relevant portions of a transmitter and receiver respectively of a pair of communication devices according to an embodiment of the invention. The transmitter 600 includes a tone orderer 602 a 2 k tone IDFT 604 a hybrid upconverter 606 and a line driver 614. The hybrid upconverter includes an X2 interpolator 608, a filter 610, and a DAC 612. The receiver 800 of the opposing communication device includes an amplifier 802 a hybrid downconverter 804, a 2 k tone DFT 814, and a tone reorderer 816. The hybrid downconverter includes an ADC 808, a filter 810, and an X2 decimator 812.

Figure 7A:
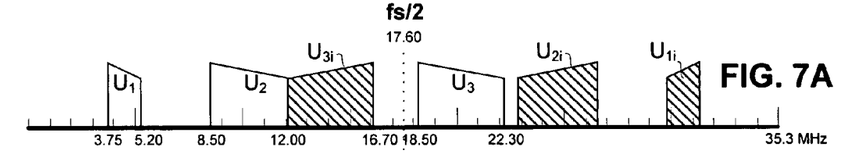
Figure 7B:
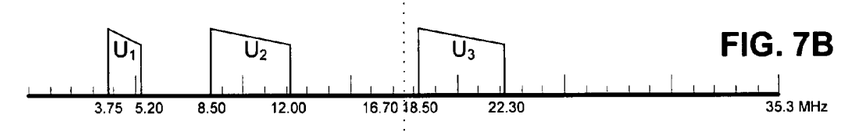
Figure 7C:
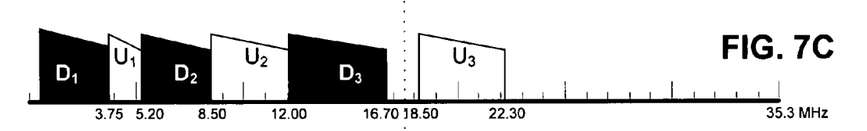

FIGS. 7A-7E are graphs showing spectral baseband images and replications thereof at various points in the transmit and receive pathways shown in FIGS. 6 and 8. FIG. 7C shows the desired downstream and upstream signal spectrum for a particular DMT 6 band modem. D1, U1 through D3, U3 represent various downstream and upstream bands.

A traditional approach would require a 4096 tone IFFT and FFT with 8.625 kHz tone spacing to process the signal in the upstream direction because the signal spectrum extends beyond 17.6 kHz. We will show how the technique explained in this invention is able to do it with a 2048 tone IFFT and FFT, and hence result in significant savings in complexity.

FIG. 6 shows the block diagram of one particular implementation for generating the transmit signal using the method of this invention. In this implementation the sampling rate of the DAC is at 70.6 MHz. FIG. 7A shows the signal at the output of interpolator 608. U1, U2, and U3 represent the base-band signals, and U1$i$, U2$i$, and U3$i$ are the folded, images, which result from sampling at 35.3 MHz. There are additional images above 35.3 MHz, which are not shown. The signals U3, U2$i$, and U1$i$ are filtered out in the hybrid upconverter by a combination of low-pass and band-stop filtering, and the image U3$i$, which is the desired frequency band is retained. This is shown in FIG. 7B. The order of frequencies are flipped in the U3$i$ image compared to the base-band signal U3, and this should be considered in tone ordering and bit loading algorithms. Also it is necessary to note that the notch filter could be implemented in the analog section after the DAC 612. However, it is easier to do it in the digital domain. It is also important to note that the interpolator 608 is needed because the DAC sampling frequency is at 70.6 MHz in this particular implementation.

At the receiver, the input signal has a spectrum similar to what is shown in FIG. 7C. The downstream bands appear in the receive direction because of leakage from the transmit into the receive path due to imperfect hybrid (echo) cancellation at the receiver.

Figure 7D:
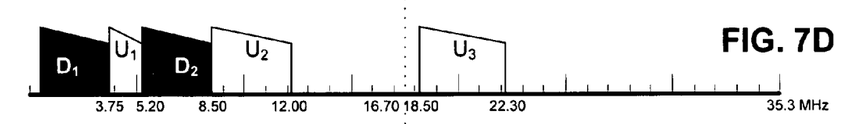
Figure 7E:
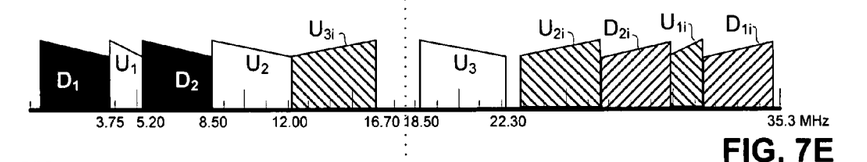

FIGS. 7D-7E shows the spectrum of the signal at various points in the receiver. Since we have a 2048 tone DFT 814 capable of processing only frequencies below 17.6 MhZ, U3 needs to be folded back onto a lower frequency. However, before this can be accomplished frequency band where U3 will be folding into, namely 13 to 16.8 MHz must be cleared as shown in FIG. 7D. This is achieved through the band stop filter, which has a stop band from 13 to 16.8 MHz. The low pass filter, which has a cut-off frequency of about 22.3 MHz, insures that higher frequency noise is prevented from aliasing and contaminating the signal. On the other hand U3 is aliased into 13 to 16.8 MHz, because the sampling frequency of the ADC is at 35.3 MHz. The spectrum at the input of the DFT is shown in FIG. 7E. Because the downstream and upstream signals are orthogonal, the FFT filters out most of the unwanted noise resulting from these signals.

Figure 9:
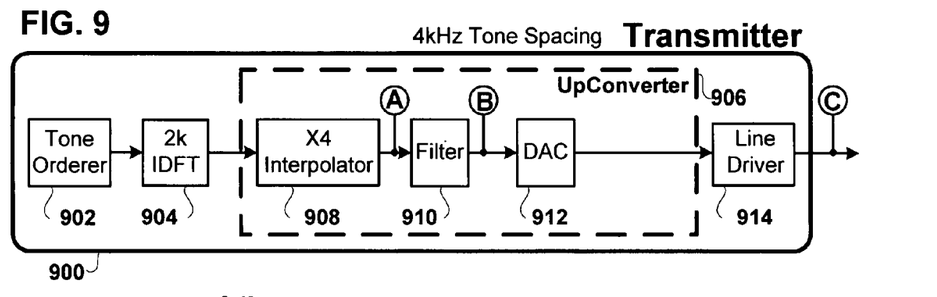
FIGS. 9 and 11 are hardware block diagrams of relevant portions of a transmitter and receiver respectively of a pair of communication devices according to an embodiment of the invention.
Figure 11:
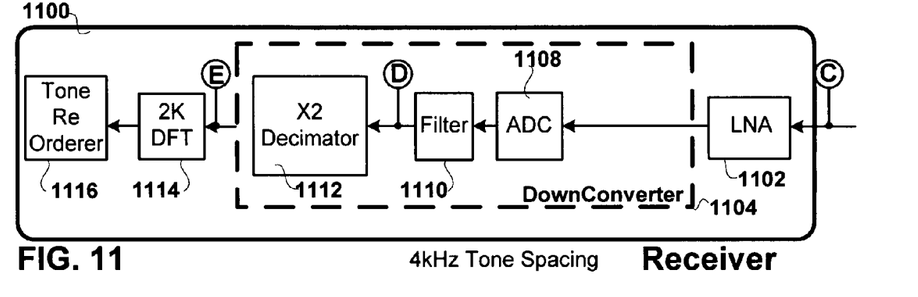

FIGS. 9 and 11 are hardware block diagrams of relevant portions of a transmitter 900 and receiver 1100 respectively of a pair of communication devices according to an embodiment of the invention.

The transmitter 900 includes a tone orderer 902 a 2 k tone IDFT 904 a hybrid upconverter 906 and a line driver 914. The hybrid upconverter includes an X4 interpolator 908 a filter 910 and a DAC 912. The receiver 1100 of the opposing communication device includes an amplifier 1102 a hybrid downconverter 1104 a 2 k tone DFT 1114 and a tone reorderer 1116. The hybrid downconverter includes an ADC 1108, a filter 1110 and an X2 decimator 1112.

Figure 10A:
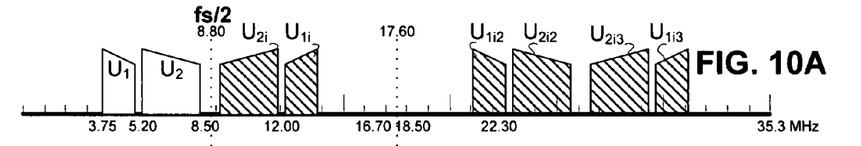
Figure 10B:
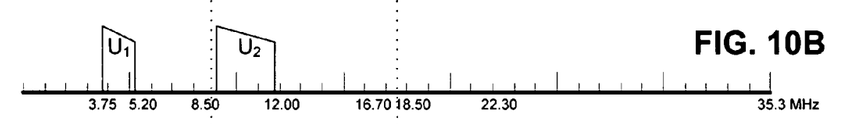
Figure 10C:
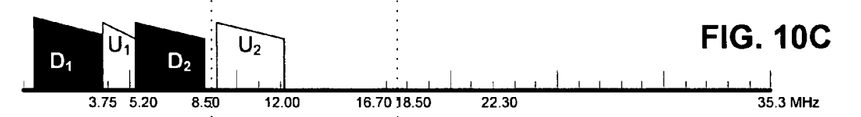

FIG. 10C shows the desired downstream and upstream signal spectrum for a standard defined 4-band 998 band plan. There are 2 downstream bands and 2 upstream bands. The tone spacing is 4.3125 kHz. As already mentioned before, in a traditional implementation, one would require a 4096 tone IFFT and FFT to implement this band plan. Using the method of this invention we will show how it can be done with only a 2048 tone IDFT and DFT.

One implementation of the transmit section of this modem, using the method of this invention, is shown in FIG. 9. The tone spacing in the IDFT 904 is at 4.3125 kHz with a sampling frequency of 17.6 MHz. The DAC 912 has a sampling rate of 70.6 MHz, hence the need for the hybrid interpolation stages. Also the hybrid upconverter is doing filtering function (low-pass and band-stop).

As shown in FIG. 10A, a base-band signal from 5.7 to 8.4, which is within the range of the 2 K IDFT 904. The output of the interpolator 908 also has the images as a result of the sampling, including the image U2*i* from 9.2 to 11.9 MHz. The filter 910 removes the original band U2 and all the unwanted images, but leaves the image U2*i*, which occupies the band of interest, and which has the same information content as U2, intact. The band U2 is filtered out so as not to interfere with the receive downstream signal occupying the same band. As mentioned before this filtering can be done either digitally or after the DAC in the analog section.

Figure 10D:
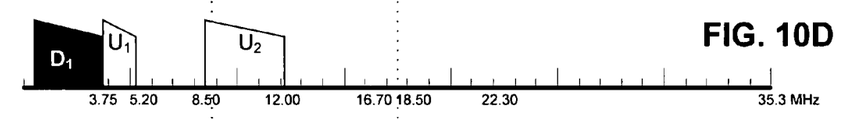
Figure 10E:
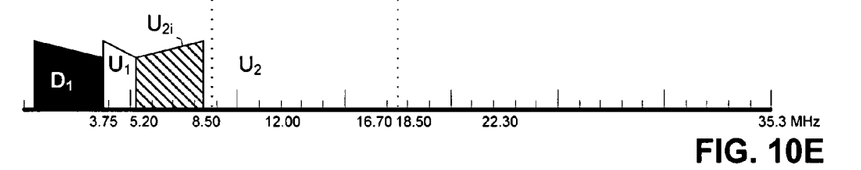

FIG. 11 shows the block diagram of one implementation of the receiver. The spectrum of the signal is shown at various points in the receive path. At the receiver, the input signal has a spectrum shown in FIG. 10C. The downstream bands appear in the receive direction because of leakage from the transmit into the receive path due to imperfect hybrid (echo) cancellation at the receiver. The ADC 1108 sampling rate in this example is at 35.3 MHz. The spectrum of the output of the ADC after filtering is shown in FIG. 10D. The decimator 1112 samples U2 at a sub-Nyquist rate and creates an image, which falls in the 5.6 to 8.4 MHz band. The band U2 and higher frequency images are filtered out before presenting the signal to the DFT 1114. The spectrum is shown in FIG. 10E. As can be seen there needs to be some guard bands to allow for filtering of the unwanted signals while keeping the desired signals intact.

Figure 12A:
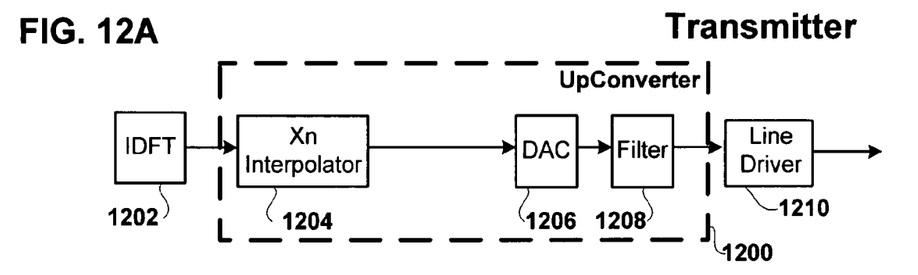
FIGS. 12A and 12B are hardware block diagrams showing alternate embodiments of the upconverter portion of the communication device transmitter shown in FIGS. 6 and 9.
Figure 12B:
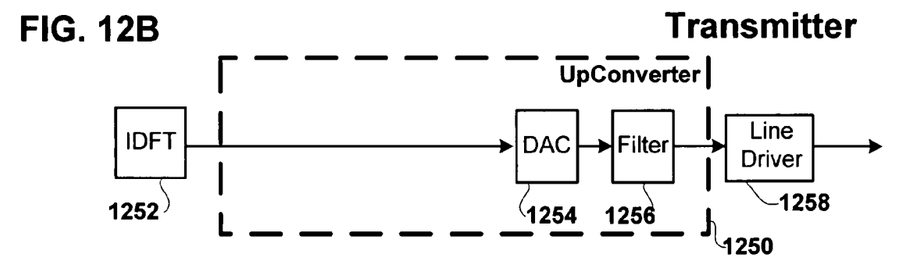

FIGS. 12A and 12B are hardware block diagrams showing alternate embodiments of the upconverter portion of the communication device transmitter shown in FIGS. 6 and 9. FIG. 12 A shows an embodiment in which IDFT 1202 couples to the various components of the hybrid upconverter 1200 including: an Xn interpolator 1204 the output of which is input to DAC 1206 before undergoing analog filtering in filter 1208. The line driver 1210 places the singal on the communication medium.

FIG. 12 B shows an embodiment in which IDFT 1252 couples to the various components of the hybrid upconverter 1250 including: a DAC 1254 before undergoing analog Filtering in filter 1256. The line driver 1258 places the signal on the communication medium.

Figure 13A:
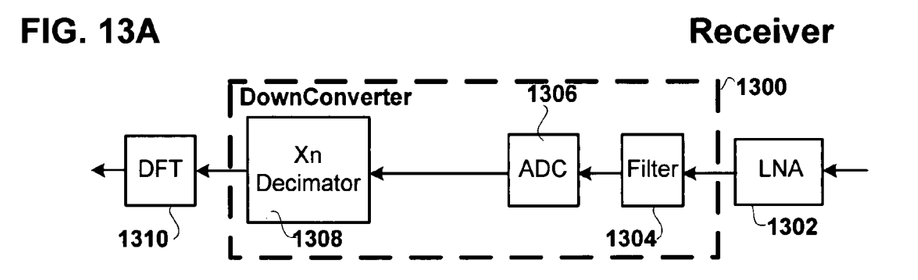
FIGS. 13A and 13B are hardware block diagrams showing alternate embodiments of the upconverter portion of the communication device transmitter shown in FIGS. 8 and 11.
Figure 13B:
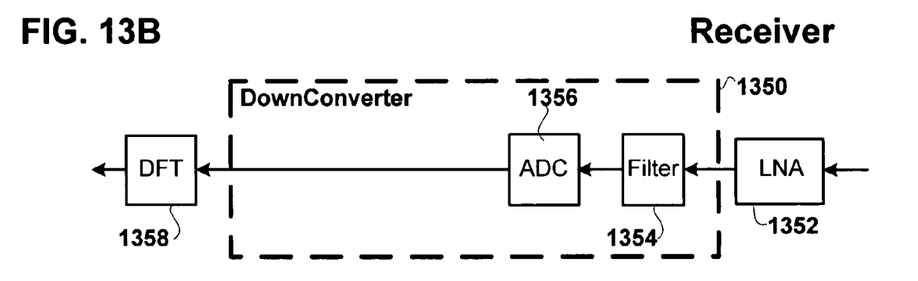

FIGS. 13A and 13B are hardware block diagrams showing alternate embodiments of the upconverter portion of the communication device transmitter shown in FIGS. 8 and 11. In FIG. 13A the low noise amplifier 1302 couples the hybrid downconverter 1300 including analog filter 1304, coupled to ADC 1306 and Xn decimator 1308 which couples to DFT 1310. In FIG. 13B the low noise amplifier 1352 couples the hybrid downconverter 1350 including analog filter 1304, coupled to ADC 1356 which couples to DFT 1358.

Figure 14:
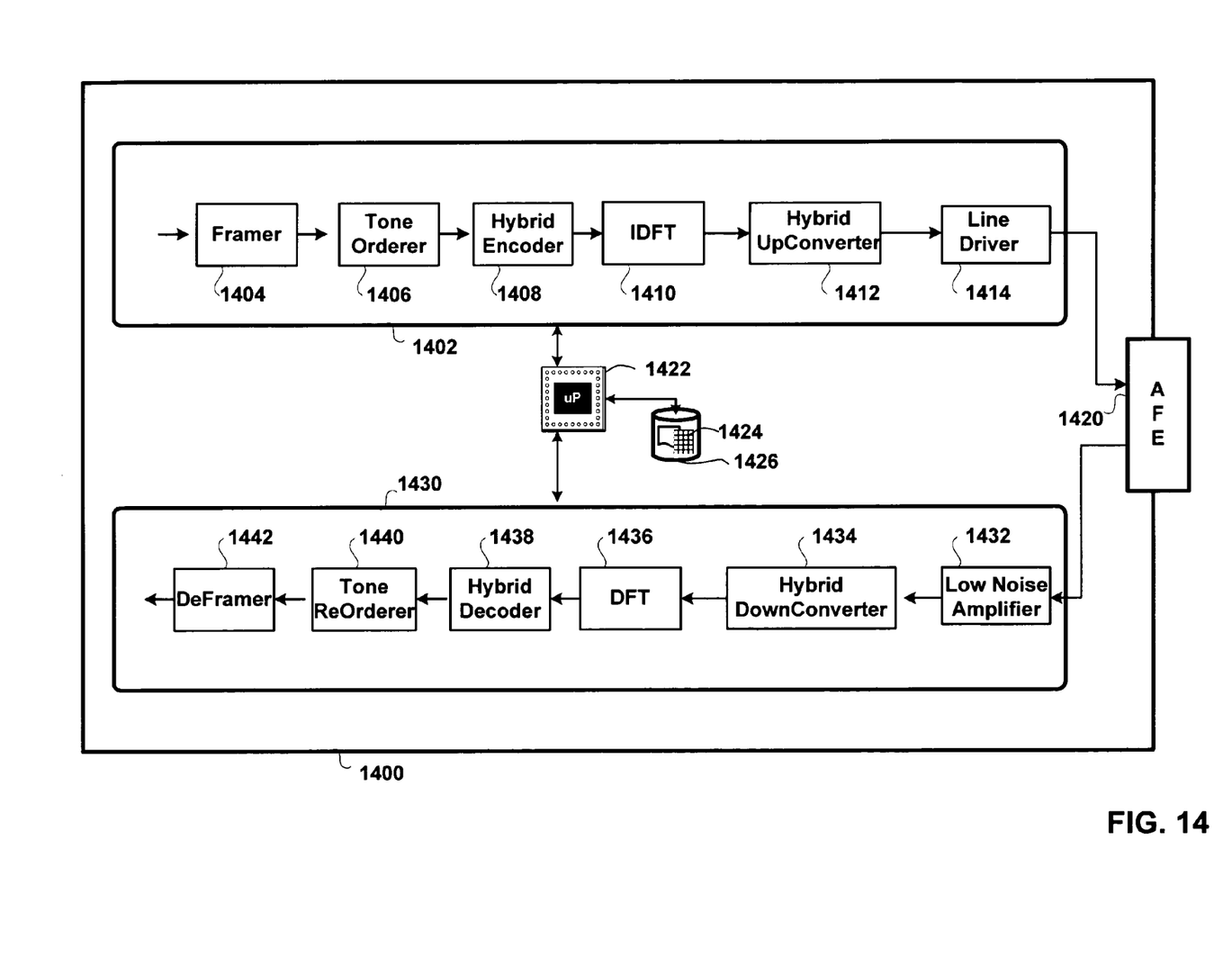
FIG. 14 is a detailed hardware block diagram of a communication device according to an embodiment of the invention.

FIG. 14 is a detailed hardware block diagram of a communication device according to an embodiment of the invention. Included on the transmit path are the framer 1404, the tone orderer 1406, the hybrid encoder 1408, the IDFT 1410 the hybrid upconverter 1412 and the line driver 1414 which couples to the AFE 1420. On the receive path the LNA 1432 couples to the hybrid downconverter 1434, which couples to the DFT 1436. The DFT couples to the hybridd decoder 1438 which couples to the tone reorderer 1440. The output of the tone reorderer couples to the deframer 1442. Processor 1422 in conjunction with program code 1424 stored in memory 1426 can reconfigure selected components for various bandplans.

Figure 15A:
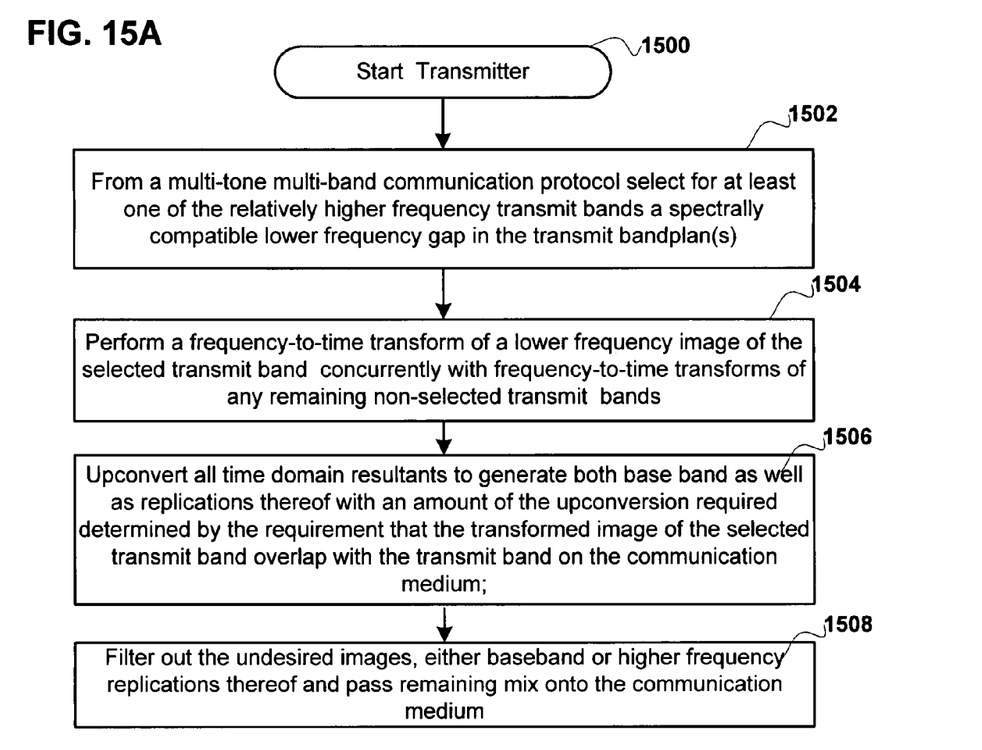
FIGS. 15A and 15B are process flow diagrams of an embodiment of the processes in the transmitter and receiver portions of a pair of communication devices coupled to one another in accordance with an embodiment of the invention.
Figure 15B:
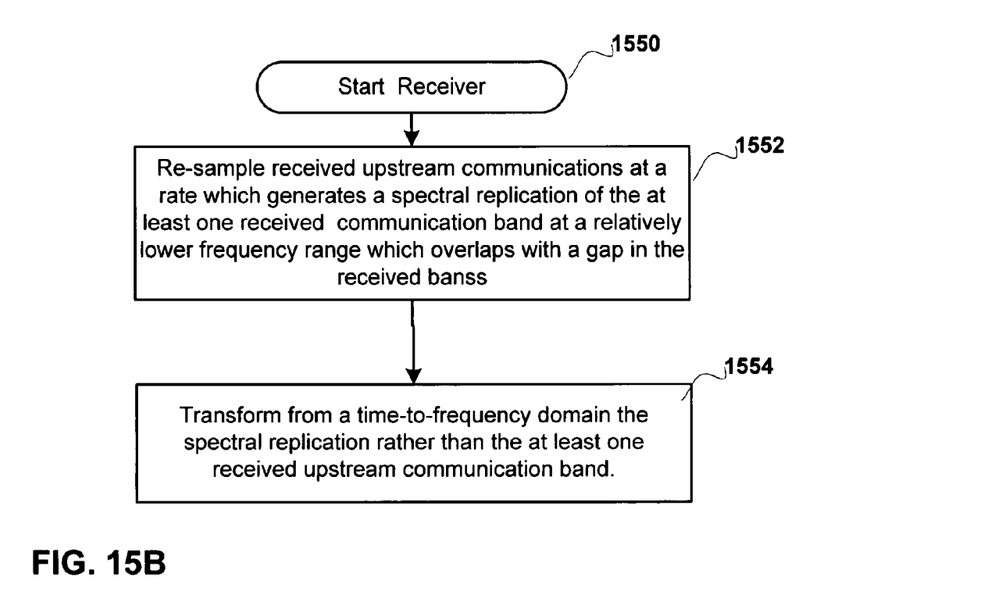

FIGS. 15A and 15B are process flow diagrams of an embodiment of the processes in the transmitter and receiver portions of a pair of communication devices coupled to one another in accordance with an embodiment of the invention. Processes 1500-1508 and 1550-1554 are shown.

The transmit and receive methods can be applied independently or jointly. The transmitter can be implemented in a traditional way and the receiver with the method described here. Conversely, the transmitter can use this method and the receiver can be a traditional one. Alternately, both the transmitter and receiver can use this method to reduce complexity. Of course, depending on which approach is selected, one would have to pay proper considerations to bit loading, tone ordering, and other associated algorithms.

The filtering needed in this method can take place in analog or digital domain. This will also depend on the choice of the sampling frequencies in DAC and ADC in any particular implementations. Also the use of interpolation and decimation would be dependent on the above sampling rates. In these examples integer interpolation and decimation are used for simplicity. However, the method would be applicable for non-integer ratios of interpolation and decimation as well.

In the above examples a single band was generated and detected that fell outside the IDFT and DFT frequency range. The same principles can be applied to generate and detect multiple bands as well, to make full use of the capacity of the IDFT and DFT. However, in these situations the complexity of the filtering will increase.

Lastly, while the method was described in connection with a DMT modem for VDSL, it should be applicable in other applications requiring similar signal processing functions.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for modulating and demodulating data on a communication medium in accordance with a proscribed band plan including frequency division multiplexed transmit and receive bands; and the apparatus comprising:
   a hybrid encoder for selecting for at least one relatively higher frequency transmit band, a spectrally compatible lower frequency gap in a transmit portion of the band plan;
   an inverse discrete Fourier transform module for performing a frequency-to-time transform of a lower frequency image of the selected transmit band concurrently with frequency-to-time transforms of any remaining non-selected transmit bands;
   a hybrid upconverter for upconverting all time domain resultants to generate both base band images as well as replications thereof with an amount of the interpolation required determined by a requirement that the transformed image of the selected transmit band overlap with the selected transmit band on the communication medium, and for filtering out the undesired images, either baseband or higher frequency replications thereof and passing remaining mix onto the communication medium.

2. The apparatus for modulating and demodulating data of claim 1, further comprising:
   a hybrid downconverter for sampling received portions of the band plan including at least one relatively higher frequency received band at a rate which generates a spectral replication of the at least one received band at a relatively lower frequency range which overlaps with a gap in remaining received portions of the band plan; and
   a discrete Fourier transform module for performing a time-to-frequency transform of the spectral replication of the at least one relatively higher frequency received band along with time-to-frequency transform of any remaining non selected received bands.

3. The apparatus for modulating and demodulating data of claim 1, wherein the hybrid encoder further comprises:
   an encoder for selecting for at least one relatively higher frequency transmit band, a spectrally compatible lower frequency gap in a transmit portion of the band plan; and
   a spectral normalizer for reversing an Hermetian symmetry of the lower frequency image of the selected transmit band.

4. The apparatus for modulating and demodulating data of claim 1, wherein the proscribed band plan exhibits a selected one of a 4.3125 kHz tone spacing and an 8.625 kHz tone spacing.

5. The apparatus for modulating and demodulating data of claim 1, wherein the proscribed band plan comprises one of an International Telecommunications Union, ITU-T G.993 band plan and an American National Standards Institute Plan 998 band plan.

6. A method for modulating and demodulating data on a communication medium in accordance with a proscribed band plan including frequency division multiplexed transmit and receive bands; and the method comprising:
   sampling received portions of the band plan including at least one relatively higher frequency received band at a rate which generates a spectral replication of the at least one received band at a relatively lower frequency range with overlaps with a gap in remaining received portions of the band plan;
   performing a time-to-frequency transform of the spectral replication of the at least one relatively higher frequency received band along with time-to-frequency transform of any remaining non selected received bands;
   selecting for at least one relatively higher frequency transmit band, a spectrally compatible lower frequency gap in a transmit portion of the band plan;
   performing a frequency-to-time transform of a lower frequency image of the selected transmit band concurrently with frequency-to-time transforms of any remaining non-selected transmit bands;
   upconverting all time domain resultants to generate both base band images as well as replications thereof with an amount of the upconversion required determined by a requirement that the transformed image of the selected transmit band overlap with the selected transmit band on the communication medium; and
   filtering out the undesired images, either baseband or higher frequency replications thereof and passing remaining mix onto the communication medium.

7. A method for modulating and demodulating data on a communication medium in accordance with a proscribed band plan including frequency division multiplexed transmit and receive bands; and the method comprising:
   sampling received portions of the band plan including at least one relatively higher frequency received band at a rate which generates a spectral replication of the at least one received band at a relatively lower frequency range with overlaps with a gap in remaining received portions of the band plan;
   performing a time-to-frequency transform of the spectral replication of the at least one relatively higher frequency received band along with time-to-frequency transform of any remaining non selected received bands; and
   reversing Hermietian symmetry of the spectral replication of the at least one received band at the relatively lower frequency range.

8. The method of claim 7, wherein the proscribed band plan exhibits a selected one of a 4.3125 kHz tone spacing and an 8.625 kHz tone spacing.

9. The method of claim 7, wherein the proscribed band plan comprises one of an International Telecommunications Union, ITU-T G.993 band plan and an American National Standards Institute Plan 998 band plan.

10. An apparatus for modulating and demodulating data on a communication medium in accordance with a proscribed band plan including frequency division multiplexed transmit and receive bands; and the apparatus comprising:

a hybrid downconverter for sampling received portions of the band plan including at least one relatively hither frequency received band at a rate which generates a spectral replication of the at least one received band at a relatively lower frequency range with overlaps with a gap in remaining received portions of the band plan;

a discrete Fourier transform module for performing a time-to-frequency transform of the spectral replication of the at least one relatively higher frequency received band along with time-to-frequency transform of any remaining non selected received bands;

a hybrid encoder for selecting for at least one relatively higher frequency transmit band, a spectrally compatible lower frequency gap in a transmit portion of the band plan;

an inverse discrete Fourier transform module for performing a frequency-to-time transform of a lower frequency image of the selected transmit band concurrently with frequency-to-time transforms of any remaining non-selected transmit bands; and a hybrid upconverter for upconverting all time domain resultants to generate both base band images as well as replications thereof with an amount of the interpolation required determined by a requirement that the transformed image of the selected transmit band overlap with the selected transmit band on the communication medium, and for filtering out the undesired images, either baseband or higher frequency replications thereof and passing remaining mix onto the communication medium.

11. An apparatus for modulating and demodulating data on a communication medium in accordance with a proscribed band plan including frequency division multiplexed transmit and receive bands; and the apparatus comprising:

a hybrid downconverter for sampling received portions of the band plan including at least one relatively higher frequency received band at a rate which generates a spectral replication of the at least one received band at a relatively lower frequency range with overlaps with a gap in remaining received portions of the band plan;

a discrete Fourier transform module for performing a time-to-frequency transform of the spectral replication of the at least one relatively higher frequency received band along with time-to-frequency transform of any remaining non selected received bands; and a hybrid decoder for reversing Hermetian symmetry of the spectral replication of the at least one received band at the relatively lower frequency range.

12. The apparatus for modulating and demodulating data of claim 11, wherein the proscribed band plan exhibits a selected one of a 4.3125 kHz tone spacing and an 8.625 kHz tone spacing.

13. The apparatus for modulating and demodulating data of claim 11 wherein the proscribed band plan comprises one of an International Telecommunications Union ITU-T G.993 band plan and an American National Standards Institute Plan 998 band plan.

* * * * *